F. E. WINCHESTER.
SWEEP FOR PRESSES.
APPLICATION FILED OCT. 16, 1912.

1,111,932.

Patented Sept. 29, 1914.

Witnesses
W. C. Fielding
George Tate

Inventor
F. E. Winchester,
By Crandall Crandall
Attorney

UNITED STATES PATENT OFFICE.

FRED E. WINCHESTER, OF THERMOPOLIS, WYOMING.

SWEEP FOR PRESSES.

1,111,932.   Specification of Letters Patent.   Patented Sept. 29, 1914.

Application filed October 16, 1912.   Serial No. 726,103.

*To all whom it may concern:*

Be it known that I, FRED E. WINCHESTER, a citizen of the United States, residing at Thermopolis, in the county of Fremont, State of Wyoming, have invented certain new and useful Improvements in Sweeps for Presses; and I do hereby declare the following to be a full, clear, and exact description of the invention, such as will enable others skilled in the art to which it appertains to make and use the same.

This invention relates to new and useful improvements in sweeps which are especially adapted for use in connection with baling presses.

The principal object of the invention is to provide a sweep of such construction for obtaining a maximum amount of power with a minimum amount of exertion.

A further object of the invention is to provide a sweep for the purpose set forth which is composed of a minimum number of parts, is therefore simple in construction and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

Figure 1:
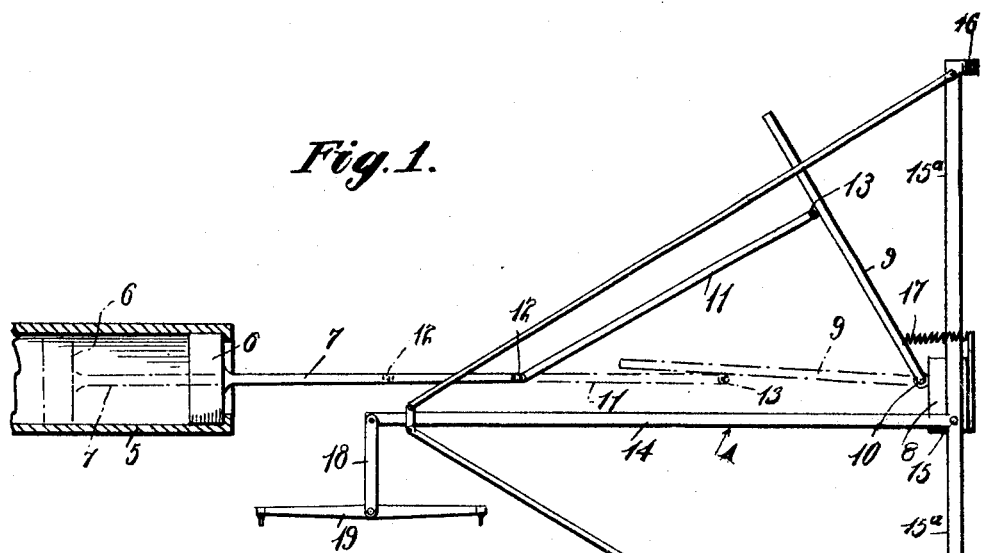
Figure 2:
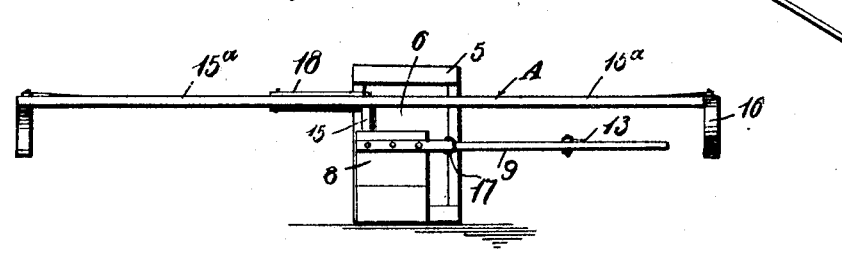
Figure 3:
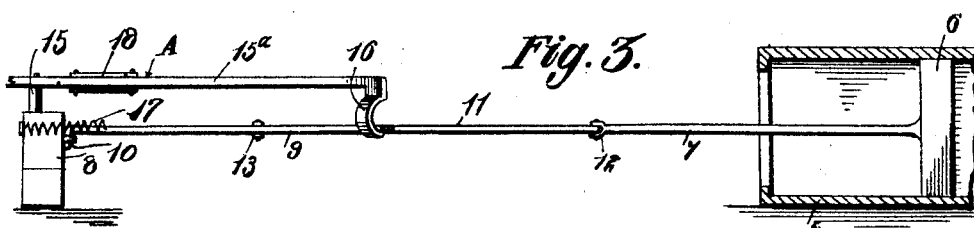
Figure 4:
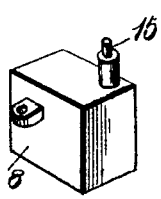

In the drawings: Figure 1 is a top plan view of the sweep constructed in accordance with my invention, the sweep being shown in position previous to its engagement with the plunger actuating arm. Fig. 2 is an end elevation thereof. Fig. 3 is a rear elevation showing the sweep in a position previous to its leaving the plunger actuating am, and Fig. 4 is a perspective view of the bearing block.

Like reference numerals designate corresponding parts in all the figures of the drawings.

Referring to the drawing, 5 designates a baling press of ordinary construction, and slidably mounted within this press is a plunger head 6, and from this head extends a plunger rod 7, said rod being fixedly connected to the head. Secured upon the ground in spaced relation to the rod 7 and in alinement therewith is a bearing block 8.

A plunger actuating lever 9 is fulcrumed at one end as at 10 to the forward portion of the block 8. A link 11 is pivotally connected at one end as at 12, to the farther end of the plunger rod 7 and at its other end as at 13 centrally of the lever 9.

My invention further comprises a sweep which is designated as a whole by the reference letter A. This sweep includes a draft arm 14 which is fulcrumed at one end upon a post 15 which is carried by the bearing block 8 and which is arranged at one side and in the rear of the pivot 10 of the lever 9. Extending laterally from the pivot end of the draft arm 14 are oppositely disposed actuating arms 15ª—15ª. These arms respectively terminate at their outer ends in downwardly bent and oppositely disposed hooks 16—16 adapted to successively engage the farther end of the lever 9 upon the rotation of the sweep A. A retractile spring 17 is connected at one end to an extension of the block 8 on the side of the pivot 10 opposite the post 15, and at its other end to the lever 9 beyond its fulcrum. Extending from the farther end of the draft arm 14 is a lateral arm 18 which is arranged parallel with the arms 15ª, and carried by the arm 18 is a swingletree or other suitable draft element 19 to which draft animals may be attached, as will be readily understood.

In practice, the draft arm 14 is rotated in a horizontal plane around a pivot or post 15. The hooks 16 will successively engage the outer end of the lever 9, and as a result will swing said lever toward the baling press 5 against the tension of the spring 17. As the lever thus moves the plunger head 6 will through the medium of the link 11 be caused to move inwardly within the press and thereby perform its function. As the head 6 reaches its limit of movement the hook 16 which is engaged with the lever 9 will be caused, by reason of the post 15 being eccentrically arranged with respect to the fulcrum 10 to become disengaged from said lever 9, and as a result the spring 17 will return said lever 9 and the head 6 to their initial positions in readiness to be actuated by the other hook 16.

What is claimed is:

1. The combination with a baling press, of a plunger head sliding therein, a plunger rod for said head, a support disposed in spaced relation to the press, a plunger actuating lever pivoted on said support eccentrically thereof, a link bar pivotally connected at one end to the outer end of the plunger rod and pivoted at its opposite end to the actuating lever at a point between the center of the actuating lever and the outer free end thereof, a rotatable sweep connected with the support and including draft mechanism, and means carried by the sweep and adapted at predetermined times in the travel of the sweep to engage with that portion of the lever between the link bar connection therewith and the free end thereof for swinging said lever to force the plunger forward in the press and means for returning the actuating lever to its initial position upon the release thereof by the sweep.

2. The combination with a baling press, of a plunger head slidably mounted therein, a plunger rod extending from the head, a bearing block disposed in spaced relation to the press, a plunger actuating lever mounted eccentrically relative to the block, a link bar connected at one end to the plunger rod and at its other end to the actuating lever at a point between the free end of the lever and the center thereof, a rotatable sweep including a draft arm, and actuating arms extending in opposite directions, oppositely disposed hooks extending downwardly from the ends of the actuating arms and adapted to successively engage the plunger actuating lever at a point between the free end of the lever and the point of connection of the link bar, to actuate said lever and force the plunger head forward in the press, and a retractile spring connected at one end with the bearing block, and connected directly to the actuating lever at its other end for returning the actuating lever to its initial position upon the release thereof of the sweep.

In testimony whereof, I affix my signature, in the presence of two witnesses.

FRED E. WINCHESTER.

Witnesses:
H. R. GARRETT,
B. E. GARRETT.

---

Copies of this patent may be obtained for five cents each, by addressing the "Commissioner of Patents, Washington, D. C."